United States Patent [19]

Reinert

[11] 4,212,292
[45] Jul. 15, 1980

[54] SOLAR COLLECTOR

[75] Inventor: Charles P. Reinert, Garvin, Minn.

[73] Assignee: Solarein, Inc., Buffalo, Minn.

[21] Appl. No.: 958,352

[22] Filed: Nov. 6, 1978

Related U.S. Application Data

[63] Continuation-in-part of Ser. No. 806,905, Jun. 15, 1977, abandoned.

[51] Int. Cl.² .................................................. F24J 3/02
[52] U.S. Cl. ...................................... 126/449; 126/428; 126/429; 165/48 S
[58] Field of Search ............... 126/270, 271, 428, 429, 126/430, 436, 449, 450; 237/1 A; 165/48 S

[56] References Cited

U.S. PATENT DOCUMENTS

| | | | |
|---|---|---|---|
| 3,102,532 | 9/1963 | Shoemaker | 126/270 |
| 3,875,925 | 4/1975 | Johnston | 126/270 |
| 3,960,205 | 6/1976 | Laing | 126/270 |
| 4,026,268 | 5/1977 | Bartos et al. | 126/271 |
| 4,059,226 | 11/1977 | Atkinson | 126/400 |
| 4,068,652 | 1/1978 | Worthington | 126/270 |
| 4,119,083 | 10/1978 | Heyen et al. | 126/270 |
| 4,124,018 | 11/1978 | Murray et al. | 126/400 X |
| 4,129,177 | 12/1978 | Harvey | 126/270 |

FOREIGN PATENT DOCUMENTS

2617324  11/1976  Fed. Rep. of Germany ........... 126/271

Primary Examiner—James C. Yeung
Assistant Examiner—Larry Jones
Attorney, Agent, or Firm—Kinney, Lange, Braddock, Westman and Fairbairn

[57] ABSTRACT

A flat plate solar collector includes a light transmissive member which is adapted to receive solar heat energy therethrough. The light transmissive member is mounted adjacent but in spaced relation to a wall to thereby define a chamber between the plate and the wall. The heat absorber comprises a fibrous heat material positioned within the volumetric space defining said chamber, which not only effectively absorbs solar heat transmitted through the light transmissive member, but also serves as a heat insulator and minimizes the escape of heat therefrom at all times.

12 Claims, 5 Drawing Figures

U.S. Patent　　　Jul. 15, 1980　　　4,212,292
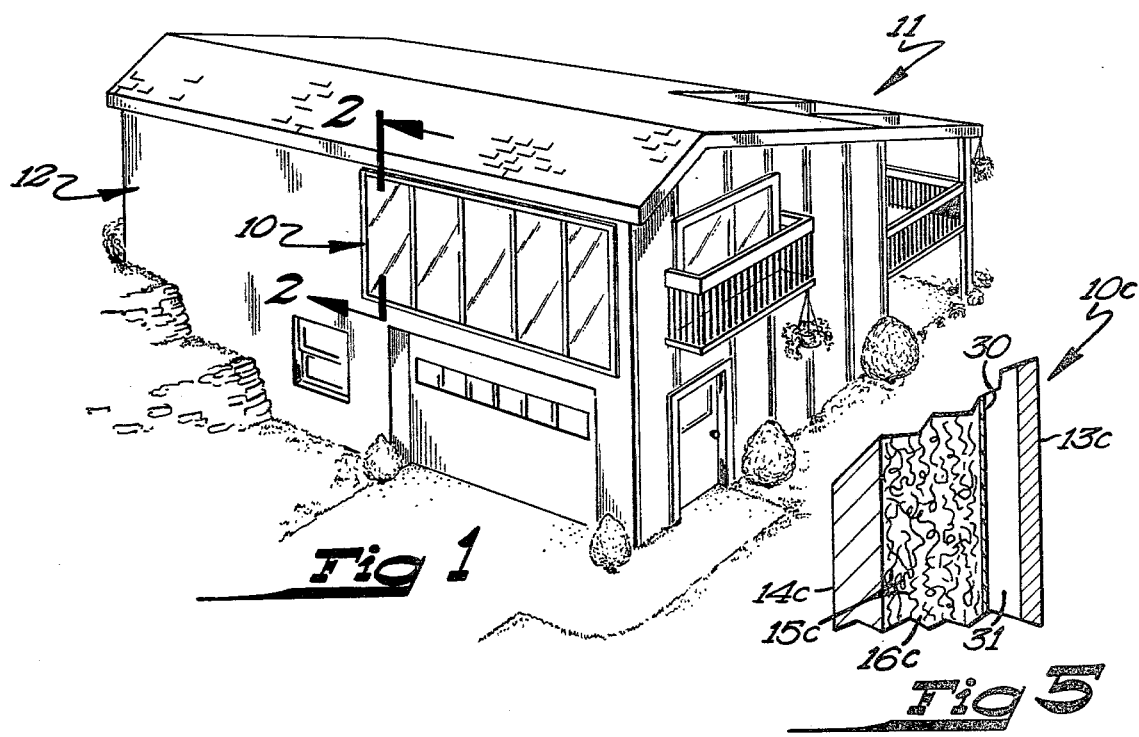
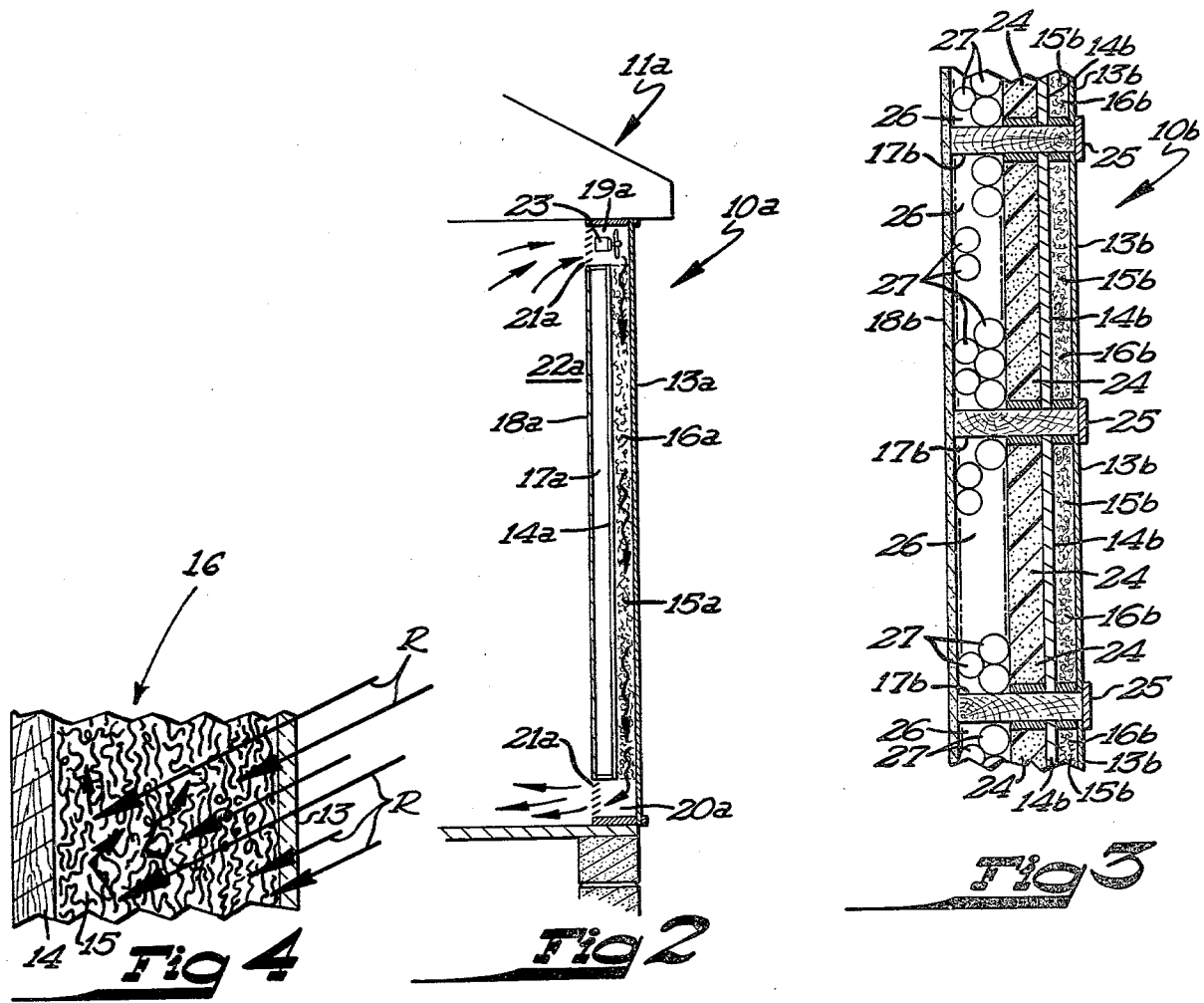

SOLAR COLLECTOR

This application is a continuation-in-part application of my co-pending application, Ser. No. 806,905, filed June 15, 1977, and entitled, "Solar Collector", now abandoned.

SUMMARY OF THE INVENTION

This invention relates to a solar heat collector and more particularly to a flat plate solar heat collector having an improved heat absorber.

In many solar collectors, solar energy is transmitted through a transparent cover glass and is absorbed by a black absorbing surface which is usually formed of metal. Tubular conduits are mounted on the black absorbing surface and a mixture of water and anti-freeze or other appropriate liquid is circulated through the conduits where the heat exchange action takes place. The heated water is often stored in a storage tank located in the basement of the building.

Another prior art type solar collector is an air type collector similar in construction to the liquid-type collector differing primarily in the use of air rather than liquid as the medium to be heated. The air type collectors often have vanes mounted on the surface of the black absorbing surface for the purpose of producing turbulence in the air moving across the absorbing surface, since air is a poor conductor of heat. However, the use of vanes to improve the efficiency of this type of collector also renders them more expensive to fabricate. There are certain prior art flat plate solar collectors which use heat absorbers that are comprised of particulate material but these heat absorbers have low thermal insulation qualities.

It is therefore a general object of this invention to provide a solar collector with a novel porous heat absorber through which fluid is circulated. The greatly increased surface area of the porous heat absorber permits thorough penetration and trapping of solar energy within the heat absorber so that a highly efficient heat absorption takes place. The greatly increased surface area of the porous absorber also produces a turbulent mixing action of the fluid as it is circulated through the porous heat absorber so that a highly efficient heating of the fluid occurs.

It is also an object of this invention to provide a solar energy collector which is of a simple and inexpensive construction and operation. The invention has special utility for agricultural purposes.

Another object of this invention is to provide a flat plate solar collector with a novel fibrous heat absorber which is not only highly efficient in collecting solar energy but also functions continuously as a thermal insulator.

These and other objects and advantages of this invention will more fully appear from the foregoing description made in connection with the accompanying drawings, wherein like reference characters refer to the same or similar parts throughout the several views.

FIGURES OF THE DRAWINGS

FIG. 1 is a perspective view illustrating a house incorporating a solar collector containing the novel porous heat absorber;

FIG. 2 is a cross-sectional view of one embodiment of a solar collector containing the novel heat absorber;

FIG. 3 is a fragmentary cross-sectional view of a portion of another embodiment of the novel solar collector illustrating details of construction thereof;

FIG. 4 is an enlarged fragmentary cross-sectional view of a portion of the solar collector illustrating the manner in which solar energy is absorbed by the novel heat absorber; and FIG. 5 is a further embodiment of my novel porous heat absorber shown in an enlarged fragmentary cross-sectional view.

DESCRIPTION OF THE PREFERRED EMBODIMENT

Referring now to the drawings and more specifically to FIG. 1, it will be seen that one embodiment of a solar collector containing the novel heat absorber and designated generally by the reference numeral 10, has been illustrated as a component of a house 11. By way of example, the solar collector 10 is illustrated as being mounted on a wall 12 of the house and is adapted to receive solar energy during a portion of the daylight hours to thereby serve as a primary or auxiliary heating source.

Referring more specifically to FIG. 2, it will be seen that the solar collector 10a is a plate-type collector and includes a light transmissive member which comprises a flat, fluid impervious, light transmissive plate 13a formed of glass or other suitable light transmissive, impervious material through which solar energy may pass. The solar collector 10a also includes a rear wall member 14a which is positioned adjacent but spaced from the light transmissive member and which is formed of an impervious material. A chamber 15a is defined between the light transmissive cover plate 13a and the wall 14a, and the novel porous heat absorber 16a is positioned in and substantially fills the chamber. The porous heat absorber is formed of a porous material which has high solar absorption and thermal insulation properties.

It will be appreciated that the greater the surface area of the absorber wiped by the passing air stream, the higher the collector efficiency tends to be. However, the greatly increased surface area due to the surface area of the many particles of fiber is of value only if the mat structure is sufficiently open that solar radiation can readily penetrate to warm all or most of the fibers. For example, the overall surface area of a solar collector chamber filled with powdered charcoal may be quite large but only the front surface or layer of particles has any appreciable value in the absorption of solar energy.

Another important factor affecting the performance of the solar collector is the average distance of the heated particles or fibers from the outside air. It will be appreciated that the loss of heat through the transparent front cover or flat plate solar collectors occurs by conduction, convection and radiation. Loss by conduction is inversely proportional to the average distance of separation between the heated particles or fibers and the outside environment. It will be seen that it is very advantageous to have a large distance separating the heated fibers and the outside environment. Therefore, it is highly desirable to have rather deep penetration of the sunlight into the fibrous absorber in order to obtain high efficiency performance.

The foregoing factors suggest that the structure of the fibrous absorber should be open in order to allow deep penetration of sunlight. However, this type of absorber configuration invites increased heat loss by convection currents, since open space allows more of such circulation to occur between the heated fibers and the outside cover plate. It will therefore be appreciated that an open fibrous absorber permits penetration of solar heat so that more fibers are heated, and also decreases heat loss by conduction by increasing the average distance between the heated fibers and the outside environment. On the other hand, if the fibrous heat absorber mat is too open, the convective heat losses are increased. It will also be appreciated that a centrifugal fan can easily move air longitudinally through a very open fibrous mat structure but such fans are ineffective in moving air longitudinally through dense fibrous mat absorbers such as ordinary fiberglass building insulation mat, even when the heat absorber is only a few feet in length.

It has been found that a very limited range of mat density and related fiber diameters is extremely effective in providing not only high solar absorption but also low heat loss by conduction and low heat loss by convection. It is also pointed out that the fan pressure necessary to force air longitudinally through my novel fibrous mat is less than one inch W.G. (water gauge), a pressure very easily produced with commercially available contrifugal fans.

This range of suitable absorber characteristics is most easily specified in terms of a simple, mathematical relationship involving the fiber thickness, "t"; the density of the material composing the fiber "df"; and the overall density of the absorber mat, "dm". In this regard, it has been found that the acceptable value of "dm" (overall density of the fibrous absorber mat) is bounded by the following:

"dm" must be greater than the quantity, $0.12 \times t \times df$, however, "dm" must be less than the quantity, $0.8 \times t \times df$.

In these relationships, "t" is expressed in centimeters, and "df" and "dm" are expressed in grams/cm.$^3$.

One example of an acceptable material as the heat absorber is a fiberglass furnace filter mat having a fiber thickness "t" of 0.005; a fiber density "df" of 2.6 gm/cm$^3$; "df" equals an actual measured value of overall density "dm" of 0.0046. When these values are applied to the above-mentioned mathematical relationship, the lower limits of the overall density must be greater than 0.00156 gm/cm$^3$. Similarly, the upper limit of acceptability must not be greater than 0.01 gm/cm$^3$. Therefore, since the actual value of overall density "dm" for the fiberglass furnace filter mat is 0.0046 gm/cm$^3$, this material is acceptable as a heat absorber for the solar collectors.

Ordinary fiberglass building insulation mat has a fiber thickness "t" of 0.00075 cm.; and has a fiber density "df" of 2.6 gm/cm$^3$. The actual measured overall density "dm" for ordinary fiberglass insulation is 0.011 gm/cm$^3$. Applying these values to mathematical relationships, it will be seen that the acceptable value of the overall density "dm" must be within the range of 0.00023 gm/cm$^3$ and 0.00156 gm/cm$^3$. It will therefore be seen that since the overall density "dm" of ordinary fiberglass building insulation is 0.011 gm/cm$^3$, this value does not lie between the upper and lower acceptable limits and is unacceptable as a fibrous absorber mat for the collector.

Similarly, steel wool, commonly used as household scouring pads (sold under the tradename, "Supreme Steel Wool Balls"), has a fiber thickness "t" of 0.005 cm. and a fiber density "df" of 7.5 gm/cm$^3$. Applying these values to the mathematical expression, it will be seen that the acceptable maximum value for the overall density "dm" is 0.03 gm/cm$^3$ and the minimum value is 0.0045 gm/cm$^3$. Since the actual overall density of steel wool is 0.09 gm/cm$^3$, steel wool is unsuitable for use as an absorber for the collector.

From the foregoing, it will be seen that only fibrous heat absorber mats having the special relationship: "dm" greater than 0.12 "dft" and "dm" less than 0.8 "dft" will provide the features of high solar absorption, high thermal insulation, and low resistance to longitudinal air flow required for my solar collector. When the fibrous heat absorber mat is comprised of glass fibers, the thickness "t" or diameter will typically range from 0.002 cm. to 0.01 cm., and the required overall density "dm" will typically range from 0.00075 gm/cm$^3$ and 0.01 gm/cm$^3$.

From one to four inches of the fibrous, porous heat absorber mat are normally used in the solar collector. For example, when my solar collector is built into a wall of a building, a three inch thickness would typically be used. It has been found that with this thickness, the thermal resistance or "R" factor is 2.5 per inch of installed thickness, or a total of 7.5 "R" factor, due to the solar collector, itself. Such a thickness of the heat absorber is therefore equivalent in insulating value to approximately two and one-fourth (1¼) inches of ordinary fiberglass building insulation. Therefore, the collector itself, supplies a significant amount of insulating value to the wall of the structure on which it is installed. In moderate climates, this insulating value may be all the insulation required in that particular wall. It will therefore be seen that my novel solar collector not only absorbs solar energy with a high efficiency, but that it also simultaneously aids significantly in insulating the wall, both during cloudy or nighttime conditions and while the sun is shining.

Another feature of my novel solar collector is that due to the multi-surfaced nature of the heat absorber mat, solar rays which are not absorbed on first contact with the fibers are further deflected throughout the mat, where they are absorbed by successive encounters with other fibers. It has been found that if the fibrous heat absorber mat is chosen with the proper fiber thickness and the proper overall density as set forth hereinabove, then the heat absorber mat is sufficiently open so that the fibers may be pigmented of nearly any color and excellent absorption will still occur.

It should be noted that in this regard that although absorption of solar energy is not quite as efficient with very light colors such as orange or yellow, as compared with black, the absoprtion of solar energy by light colored heat absorbers tends to occur further back or deeper in the heat absorber, thereby further decreasing the heat loss by conduction. Therefore, the result is that the mat efficiency for colored absorbers is nearly the same as for black absorbers.

It is also pointed out that the performance of the solar collector can be further improved, especially for colored fibrous heat absorbers, by lining the back of the collector chamber with a reflective material, such as ordinary foil. In this case, the solar rays which are not absorbed in passing through the absorber mat will become reflected to pass once more through the mat, thus effectively doubling the thickness of the mat.

When the solar collector is mounted on the wall of a house, as illustrated in the drawings, the rear wall 14a of the solar collector may constitute the standard construction sheating of the house wall. The solar collector may be secured to the wall studs 17a and suitable insulation may be interposed between the sheathing and the inside wall 18a.

The solar collector, which is normally of rectangular configuration, may be vertically oriented, as shown, and may be provided with an inlet opening 19a at the upper end of the collector and may be provided with an outlet opening 20a at its lower end. These openings 19a and 20a may extend the full width of the solar collector and a suitable grill-type filter 21a may be provided across the openings to prevent the passage or large air entrained material therethrough. A fan 23 positioned in the opening 19a impells air downwardly and longitudinally through the heat absorber and into the interior space 22a.

It has been found that the novel porous absorber has several advantages over prior art heat absorbers. The porous, fibrous, multi-surfaced nature of the heat absorber, presents a much larger effective surface area than any of the prior art heat absorbers which are in the form of non-porous construction. Heat absorption by the heat absorber is a function of the surface area available for heat absorption. Thus, the porous multi-surfaced character of the fiberglass heat absorber mat provides a much higher efficiency than prior art devices. It has been found that the random surfaced pattern and the depth (thickness dimension) of the multi-surfaced porous fiberglass absorber mat, provides a trapping action with respect to the solar energy transmitted through the cover plate. In this respect, any solar ray which is not absorbed by the surface it initially strikes will be deflected against adjacent surfaces where absorption will occur within the porous, multi-surfaced heat absorber, as depicted in FIG. 4. As the solar rays are deflected about within the porous multi-surfaced heat absorber, each deflecting contact of solar rays with a surface results in some absorption. It is also pointed out that some of the solar energy will initially strike the deeper surfaces because of the open random surface pattern. Thus, the porous characteristics of the heat absorber permit initial absorption and trapping action of the solar throughout the thickness dimension of the heat absorber.

Although the passage of air through the fibrous heat absorber is laminar, it has also been found that the random pattern of the surfaces of the porous heat absorber which results in local turbulence and good mixing in the fluid stream. This local turbulent effect of the fluid therefore provides a good thermal contact with the absorber surfaces. Good thermal contact between the fluid and the surfaces results in highly efficient transfer of heat from the surfaces to the fluid.

Referring now to FIG. 3, it will be seen that a further embodiment of the solar collector is thereshown and is designated generally by the reference numeral 10b. A solar collector 10b is shown mounted on the wall of a building and includes a flat light transmissive cover plate 13b, a rear wall 14b in the form of a standard sheating, a chamber 15b, and a porous heat absorber 16b positioned in the chamber 15b. The term, building, as used herein, includes, but is not restricted to houses, apartments, office buildings, commercial and industrial buildings, agricultural structures of all kinds, schools, hospitals, civic structures and the like. In this embodiment, the solar collectors 10b are positioned between adjacent vertical wall studs 17b, the latter having firring strips 25 secured to their outer vertical surfaces.

It will be noted that a space or chamber 26 is defined between the sheathing 14b and the inside wall 18b. Partially filling the volumetric space 26 is a sheet of insulation 24 which is positioned against the sheathing 14b. The remaining volumetric space of the chamber 26 contains a plurality of heat storing elements 27 which, as shown, are in the form of small containers which contain heat storage material such as paraffin, eutectic salts or the like. Although not shown in the drawing, the fluid which is circulated longitudinally through the heat absorber 16b is directed into the volumetric space 26 where a heat exchange action takes place between the heat storage elements 27 and the heated fluid. Inlet and outlet means are provided which interconnect chamber 26 with the interior space to be heated in substantially the same manner as that shown in FIG. 2. These storage elements serve as heat sinks and the stored heat may be used as desired. It is pointed out that the heat storage elements may also be stored in horizontal walls, such as floors or ceilings. Thus, the expression, wall structure, as used herein as a location for the heat storage elements includes both horizontal as well as vertical walls.

Referring now to FIG. 5, it will be seen that a further embodiment of a solar collector incorporating my novel heat absorber is thereshown. The multi-surfaced, porous, heat absorber 16c is a component of a solar collector 10c embodying a light transmissive member 13c. The heat absorber 16c is positioned between a rear member 14c and light transmissive member 13c but does not fill the volumetric space therebetween. A film or sink 30 of transparent plastic or other suitable light transmissive material is positioned against the front surface of the heat absorber, such as a matting of glass fibers, but is spaced from the light transmissive cover 13c. A space 31 is defined between the film 30 and cover 13c and serves as an insulating medium to minimize the loss of heat through the cover 13c. There is some heat loss through the cover 13c especially when the outside temperature is cold. Thus, the use of an inexpensive skin, which may be bonded to the heat absorber, reduces the need for a double cover plate.

Although the embodiments illustrated herein all show the use of air as the heated fluid, it is also pointed out that my porous heat absorber can be used in a liquid type solar collector system. The liquid to be heated would preferably be a water/anti-freeze solution and will be circulated through the porous absorber by a suitable pump, and would have all the advantages of the air-type system. The liquid system could be readily used as a water heating system for the hot water heating systems, in domestic hot water use, or any other uses of hot water. It is pointed out that when the solar collector is used in a liquid system, the rear wall 14 will have to be liquid impervious.

In actual test, it has been found that the heat output from the collector is typically 75 watts/feet$^2$ for direct solar incidence at approximately 70° F. environmental temperature. At 0° F., the heat output drops to approximately 40 watts/feet$^2$ which is considered to be a value higher than most commercial prior art units. Many prior solar collectors also use two sheets of cover glass while the present unit requires only a single cover glass. The cost and installation of the porous fiber glass absorber mat is also relatively inexpensive when compared to prior art collectors. There is an especial saving in that the porous, multi-surfaced absorber requires no expensive copper or aluminum, common in many of the state of the art collectors.

It will therefore be seen from the preceding paragraphs, that I have provided a solar collector which is not only of simple and inexpensive construction and operation, but one which functions in a highly efficient manner.

What is claimed is:

1. A solar collector for collecting solar energy in combination with a building having a wall structure including a wall element comprising:
   a light transmissive member mounted on said wall and adapted to receive solar heat energy therethrough;
   said light transmissive member defining a central plane and being disposed in spaced relation with respect to said wall element and cooperating with the latter to define a chamber therebetween,
   a heat absorber comprising a fibrous, porous mat substantially filling the volumetric space defining said chamber, said mat having a thickness dimension generally perpendicular to the light transmissive member and a longitudinal dimension generally parallel to the central plane, and said mat absorbing solar heat transmitted through said light transmissive member, said fibrous mat being substantially uniform in density and having an overall density within the range of 0.12 td$_f$ and 0.8 td$_f$, where t is the fiber thickness and d$_f$ is the density of the material comprising the fiber,
   an inlet and an outlet for said chamber spaced apart in direction along the longitudinal dimension of the mat through which air is directed to be circulted through the porous fibrous mat fibers whereby the air will be heated by surface contact with the fibers as the air is circulated therethrough.

2. A solar collector as defined in claim 1 wherein said fibrous mat comprises colored, glass fibers.

3. A solar collector as defined in claim 1 wherein said wall element has a reflective surface facing said light transmissive member.

4. A solar collector as defined in claim 1 wherein said wall structure has an inner space,
   heat storage means comprising a plurality of heat storage elements mounted within the inner space of the wall structure, said building having an interior area to be heated, the inlet and outlet of the collector chamber communicating with the inner space of the wall structure, and said inner space containing the heat storage elements having an inlet and outlet interconnecting said inner space with the interior area to be heated.

5. The solar collector as defined in claim 1 wherein said fibrous mat is comprised of glass fibers having randomly arranged heat absorbing surfaces, whereby some of the solar energy transmitted through the light transmissive plate will be deflected deeply into the mat of glass fibers in direction of the mat thickness, and will be absorbed by said randomly arranged surfaces of the glass fibers disposed at location spaced inwardly from the outer surface of the absorber.

6. A solar collector as defined in claim 1 wherein said mat of fibers comprises colored, glass fibers.

7. A solar collector as defined in claim 1 wherein said wall element has a reflective surface facing said light transmissive member.

8. The solar collector of claim 1 wherein the inlet and outlet are spaced apart in direction along the length of the wall element.

9. The solar collector of claim 1 wherein the wall element is oriented so the light transmissive member is generally upright and the chamber is elongated in upward direction, said inlet being located adjacent the upper end of said chamber, and the outlet being located adjacent the lower end of said chamber.

10. A collector for collecting solar energy comprising:
    a light transmissive member adapted to receive solar heat energy therethrough;
    a wall means disposed in spaced relation with respect to said light transmissive member and cooperating with the latter to define a chamber therebetween,
    a heat absorber comprising a mat of glass fibers substantially filling the volumetric space defining said chamber, and absorbing solar heat transmitted through said light transmissive member, said fibers having a thickness dimension within the range of about 0.002 cm. to 0.01 cm., said mat having an overall density of within the range of 0.0016 gm/cm$^3$ and 0.01 gm/cm$^3$,
    an inlet and an outlet for said chamber through which air is directed to be circulated in direction along the space between the light transmissive member and the wall means and through the mat of glass fibers whereby the air will be heated by surface contact with the glass fibers as the air is circulated therethrough.

11. A solar collector for collecting solar energy in combination with a building having a wall structure including a wall element comprising:
    a light transmissive member mounted on said wall and adapted to receive solar heat energy therethrough,
    said light transmissive member having dimensions defining a surface area exposed to solar radiation and being disposed in spaced relation with respect to said wall element and cooperating with the latter to define a chamber therebetween,
    a heat absorber comprising a mat of glass fibers substantially filling the volumetric space defining said chamber, and absorbing solar heat transmitted through said light transmissive member, said fibers having a thickness dimension within the range of 0.002 cm. to 0.01 cm., said mat having an overall density within the range of about 0.0016 gm/cm$^3$ and 0.01 gm/cm$^3$,
    an inlet and an outlet for said chamber through which air is directed to be circulated through the mat of glass fibers generally in direction along the wall element and light transmissive member whereby the air will be heated by surface contact with the glass fibers as the air is circulated therethrough.

12. The solar collector of claim 11 wherein said light transmissive member has a longitudinal dimension substantially greater than the distance between the wall means and the light transmissive member and wherein the inlet and outlet are located at opposite ends of said chamber in direction along the longitudinal dimension.

* * * * *